(12) United States Patent
Lindenman et al.

(10) Patent No.: US 7,261,311 B2
(45) Date of Patent: Aug. 28, 2007

(54) FIFTH WHEEL HITCH ASSEMBLY WITH SELF-LOCATOR

(75) Inventors: Thomas W. Lindenman, South Bend, IN (US); Richard W. McCoy, Granger, IN (US); Anthony S. Roberts, Granger, IN (US)

(73) Assignee: Cequent Towing Products, Inc., Plymouth, MI (US)

( * ) Notice: Subject to any disclaimer, the term of this patent is extended or adjusted under 35 U.S.C. 154(b) by 0 days.

(21) Appl. No.: 10/920,052

(22) Filed: Aug. 17, 2004

(65) Prior Publication Data

US 2005/0077702 A1 Apr. 14, 2005

Related U.S. Application Data

(60) Provisional application No. 60/496,234, filed on Aug. 19, 2003.

(51) Int. Cl.
*B62D 53/08* (2006.01)
*B60D 1/50* (2006.01)

(52) U.S. Cl. .................. 280/433; 280/438.1; 280/483; 280/492

(58) Field of Classification Search ............ 280/428.1, 280/439, 440, 446.1, 483, 485, 489, 492, 280/433, 438.1
See application file for complete search history.

(56) References Cited

U.S. PATENT DOCUMENTS

| | | | |
|---|---|---|---|
| 1,380,490 A * | 6/1921 | Masury | 280/439 |
| 1,412,025 A | 4/1922 | Martin et al. | |
| 1,483,613 A | 2/1924 | Payne | |
| 2,507,616 A | 5/1950 | Stephen | |
| 2,543,749 A | 3/1951 | Walther | |
| 4,199,168 A * | 4/1980 | Bush et al. | 280/439 |
| 4,721,323 A | 1/1988 | Czuk et al. | |
| 5,464,241 A * | 11/1995 | Flater | 280/425.1 |
| 5,509,682 A | 4/1996 | Lindenman et al. | |
| 5,529,329 A | 6/1996 | McCoy | |
| 5,839,745 A * | 11/1998 | Cattau et al. | 280/434 |
| 6,135,483 A * | 10/2000 | Metz | 280/439 |
| 6,135,485 A * | 10/2000 | Filbrun | 280/493 |
| 6,170,849 B1 * | 1/2001 | McCall | 280/433 |
| 6,170,850 B1 * | 1/2001 | Works | 280/433 |
| 6,474,674 B2 * | 11/2002 | Piercey, III | 280/441 |
| 6,502,846 B2 | 1/2003 | Fandrich et al. | |
| 6,581,951 B2 * | 6/2003 | Lange | 280/440 |
| 2003/0209878 A1 * | 11/2003 | Lindenman et al. | 280/433 |
| 2005/0194763 A1 * | 9/2005 | Yoder | 280/493 |

* cited by examiner

*Primary Examiner*—Lesley D. Morris
*Assistant Examiner*—Marc A. Scharich
(74) *Attorney, Agent, or Firm*—McDonald Hopkins LLC; Robert H. Earp, III

(57) ABSTRACT

Typical fifth wheel hitch assemblies require the operator to leave the cab of the vehicle to put the fifth wheel hitch assembly into position to receive a king pin of a trailer. The present invention is a fifth wheel hitch assembly that comprises a base assembly, a head assembly pivotally connected to the base assembly about a generally horizontal axis, the head assembly being pivotable between a raised position and a lowered position, and at least one biasing member urging the head assembly into the raised position.

18 Claims, 3 Drawing Sheets

FIFTH WHEEL HITCH ASSEMBLY WITH SELF-LOCATOR

CROSS-REFERENCE TO RELATED APPLICATIONS

This application claims priority from U.S. Provisional Patent Application No. 60/496,234 filed on Aug. 19, 2003, which is expressly incorporated by reference herein.

TECHNICAL FIELD

The present invention relates generally to the trailer-towing field and, more particularly, to a fifth wheel hitch assembly incorporating a self-locator.

BACKGROUND

Fifth wheel hitches are well known to those in the trailer-towing field. Various models of fifth wheel hitches have been manufactured and sold by Cequent Towing Products, Inc. and its predecessors. Typically fifth wheel hitch assemblies include a mounting assembly that is secured under the bed to the frame of the pickup truck, a base assembly, and a head assembly. The base assembly connects to the mounting assembly and supports the head assembly. The head assembly includes a skid plate and a locking jaw mechanism. The locking jaw mechanism secures the king pin of the trailer being towed in proper position with the weight of the trailer properly supported on the skid plate. Examples of fifth wheel hitch assemblies incorporating such a structural arrangement are found in U.S. Pat. No. 4,721,323 to Czuk et al., U.S. Pat. No. 5,509,682 to Lindenman et al., and U.S. Pat. No. 5,529,329 to McCoy.

The present invention relates to a fifth wheel hitch assembly incorporating a self-locator that automatically positions the head assembly in a home position where the head assembly is properly angularly oriented for reliable and efficient connection to the king pin of a trailer.

SUMMARY OF THE INVENTION

In accordance with the purposes of the present invention as described herein, a fifth wheel hitch assembly is provided for towing a trailer behind a towing vehicle. The fifth wheel hitch assembly includes a base assembly, a head assembly pivotally connected to the base assembly about a generally horizontal axis, the head assembly being pivotable between a raised position and a lowered position, and at least one biasing member urging the head assembly into the raised portion.

Still other features and advantages of the present invention will become readily apparent to those skilled in this art from the following description wherein there is shown and described a preferred embodiment of this invention simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain certain principles of the invention. In the drawings.

Figure 1:
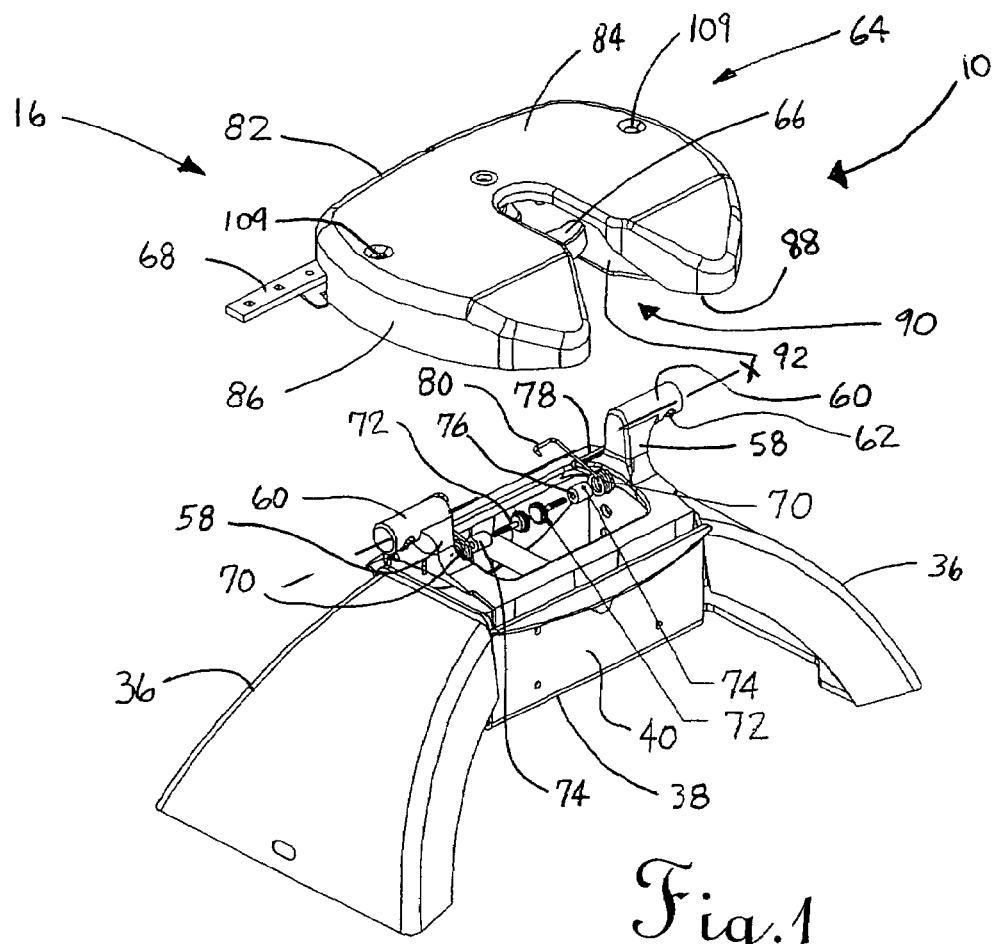
FIG. 1 is a partially exploded, detailed perspective view of a fifth wheel hitch assembly with a self-locator of the present invention.

Reference will now be made in detail to the present preferred embodiment of the invention, an example of which is illustrated in the accompanying drawings.

DETAILED DESCRIPTION

Reference is now made to the drawings depicting a fifth wheel hitch assembly 10 of the present invention. The assembly 10 includes a base assembly 14, a head assembly 16, and a self-locator or, more particularly, at least one biasing member 12. The biasing member 12 urges the head assembly 16 into a home position relative to the base assembly 14, or more specifically, urges the head assembly 16 into a raised position. The fifth wheel hitch assembly 10 of the present invention mounts to a vehicle (not shown), typically mounting to the bed of the vehicle by a variety of known mounting assemblies.

The base assembly 14 is of modular configuration and comprises first and second legs 36 and a central housing 38. Further, the central housing 38 includes first and second end walls 40 and first and second sidewalls 42. A rocker 44 is received in and is pivotally connected to the central housing 38. In particular, the rocker 44 pivots about a pivot pin or trunnion 46. As a result of this arrangement the rocker 44 pivots freely from side to side with respect to the central housing 38. Advantageously, the pivot pin or trunnion 46 has a length to diameter ratio of about 7:1 to provide quieter operation.

Figure 2:
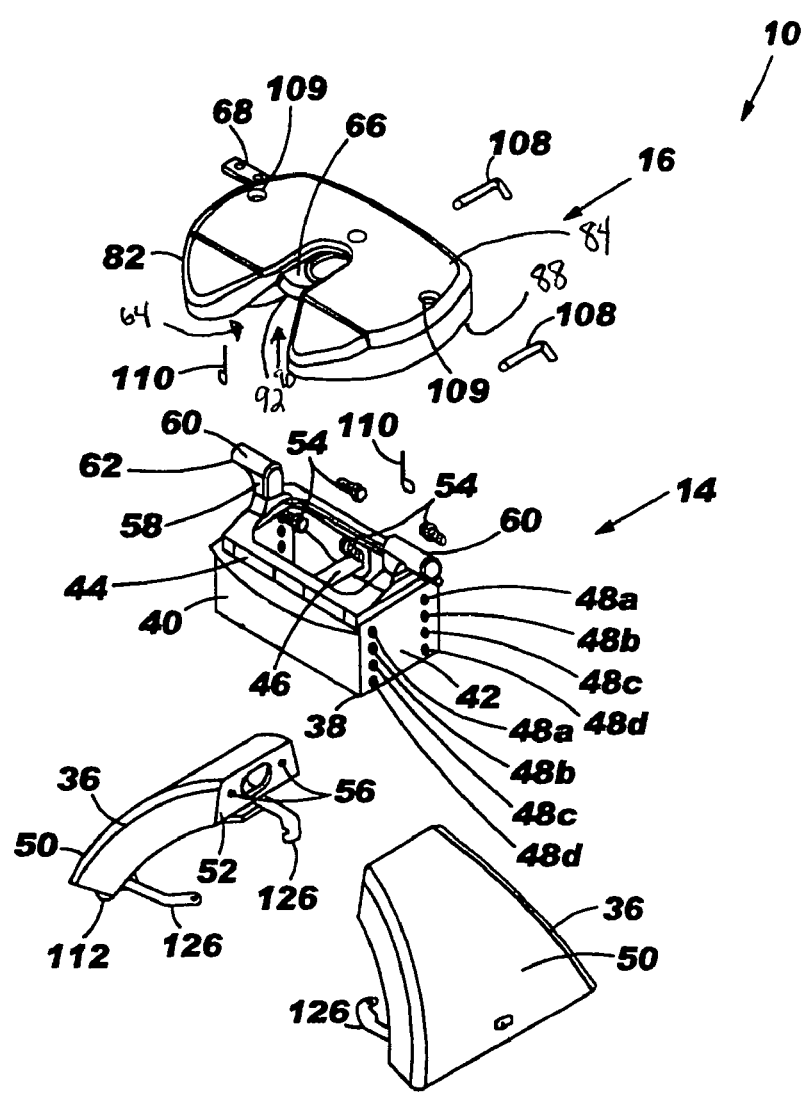
FIG. 2 is an exploded perspective view of the fifth wheel hitch assembly including a base assembly and a head assembly.

As shown in FIG. 2, the sidewalls 42 of the central housing 38 each include a series of spaced mounting points 48a-48d. In the illustrated embodiment, the mounting points 48a-48d comprise a first series of vertically spaced apertures in the first sidewall 42 and a second series of vertically spaced apertures in the second sidewall 42. As further illustrated, each leg 36 includes an outer section 50 and an inner section or mounting wall 52 that nests with and is welded to the outer section 50. Fasteners 54 in the form of bolts are utilized to secure the legs 36 to the sidewalls 42 of the central housing 38. More particularly, the bolts 54 are inserted through any one set of the series of vertically spaced mounting apertures 48a-48d and threadedly engaged in the apertures 56 in the inner section or mounting walls 52 of the legs 36. As should be appreciated, the height of the central housing 38 relative to the legs 36 may be adjusted depending upon which set of the series of vertically spaced mounting apertures 48 is selected to complete the connection.

The legs 36 preferably are arched and have a radius of curvature of between about 17 to about 21 degrees and typically about 19 degrees. The radius of curvature may be constant or may vary over the length of the legs 36. The arched legs 36 define an arc of between about 45 to about 90 degrees and typically about 60 degrees. Advantageously, the arched base assembly 14 provides not only added strength but also better and more favorable distribution of the trailer weight across the fifth wheel hitch assembly 10 and the towing vehicle (i.e., provides optimum vertical down strength). Further, the arched configuration of the legs 36 delivers loads efficiently through the vehicle frame in a more direct path. Fore/aft loads are delivered in a more compact manner (flaring).

Figure 3:
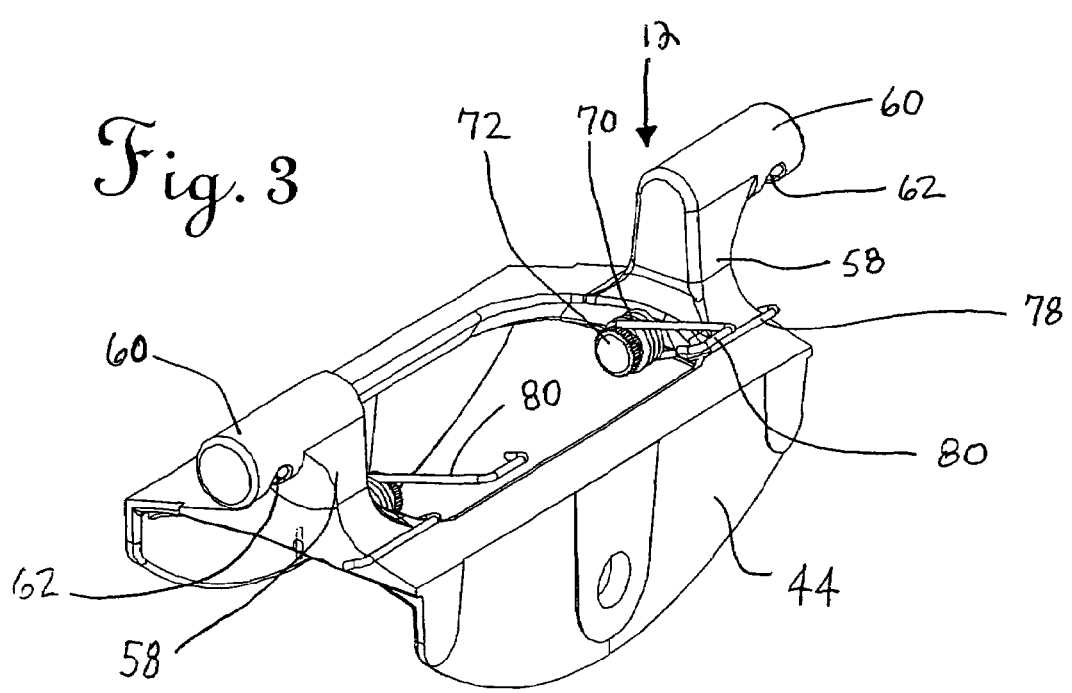
FIG. 3 is a detailed perspective view of a rocker of the base assembly carrying the self-locator.

As best illustrated in FIG. 3, the rocker 44 includes two upstanding posts 58. Each of the posts 58 carries a first and second trunnion 60. As illustrated, the first and second trunnions 60 project outwardly in opposing directions. Each of the trunnions 60 includes an undercut groove 62, the function of which will be described in greater detail below.

In addition, the trunnions 60 are offset by about 0.5 to 1.0 inches and typically about 0.75 inches from the fore-and-aft centerline of the rocker 44 in the central housing 38. Thus, by selective orienting of the ends of the central housing 38 between the legs 36, the trunnions 60 may be adjusted fore-or-aft relative to the vehicle bed by as much as 1.0 to 2.0 inches. This advantageously provides the operator with a convenient way to adjust load distribution relative to the rear axle of the vehicle.

The head assembly 16 is pivotally connected to the base member 14 about a generally horizontal axis X and is pivotable between a raised position and a lowered position. The head assembly 16 further includes a skid plate 82. The skid plate 82 has a top wall 84 and an integral downwardly depending peripheral skirt 86 defining a hidden cavity 88 beneath the top wall 84. A throat 90 functions to receive the king pin of a trailer. A mounting platform 92 is welded or otherwise attached to the bottom face of the skid plate 82 and is held in the cavity 88. A locking jaw assembly 64 includes a jaw body 66 that is pivotally mounted to the mounting platform 92. A single or multi-piece control handle 68 is connected to the jaw body 66 by a connecting link (not shown). Thus, an operator may open and close the locking jaw assembly 64 as desired by manipulating the control handle 68 in a manner known in the art.

As shown in FIG. 3, the self-locator, or more particularly, the two biasing members 12 shown are mounted on the rocker 44 (note: because of the scale of FIG. 1 and for purposes of clarity the self-locator is not illustrated on the rocker 44 in FIG. 1.) As shown in FIG. 3, the biasing members 12 each include a torsion spring 70 that is secured by a thumbscrew 72 adjacent each post 58. More specifically, each torsion spring 70 is positioned concentrically around a spacer 74. A thumb screw 72 is then inserted through the central bore 76 of the spacer 74 and tightened in a threaded aperture in the rocker 44 adjacent each post 58. Thus one torsion spring 70 is provided on each side of the rocker 44. Each torsion spring 70 includes a first end 78 that engages the body of the rocker 44 (i.e., the base assembly 14) and a second end 80 that engages the mounting platform 92 of the head assembly 16.

Opposing pivot guides (not shown) are welded between the mounting platform 92 and the skirt 86 of the skid plate 82. When the head assembly 16 is properly seated on the rocker 44, the pivot guides are received over and rest upon the trunnion 60. Connecting pins 108 are then inserted through aligned apertures in the pivot guides and the grooves 62 in the trunnion 60. Pin clips 110 are then received over the ends of the connecting pins 108 in order to complete the connection of the head assembly 16 to the base assembly 14. Apertures 109 provided in the skid plate 82 provide a sight path for visually confirming the placement of the pins 108 and clips 110.

Advantageously, the rocker 44 pivots about the pivot pin 46 to provide the head assembly 16 with limited side-to-side pivotal movement while the pivot guides pivot above the trunnion 60 and function to provide the head assembly 16 with limited fore-and-aft pivotal movement. This arrangement functions to allow the head assembly 16 to better support a trailer during towing operations including, for example, during slow speed towing over various terrain contours as might be found at a campsite.

The base assembly 14 is connected to the mounting system by means of four feet 112. Control handles 126 allow the feet to be locked on the mounting assembly so that the base assembly 14 is secured to the vehicle.

Figure 4:
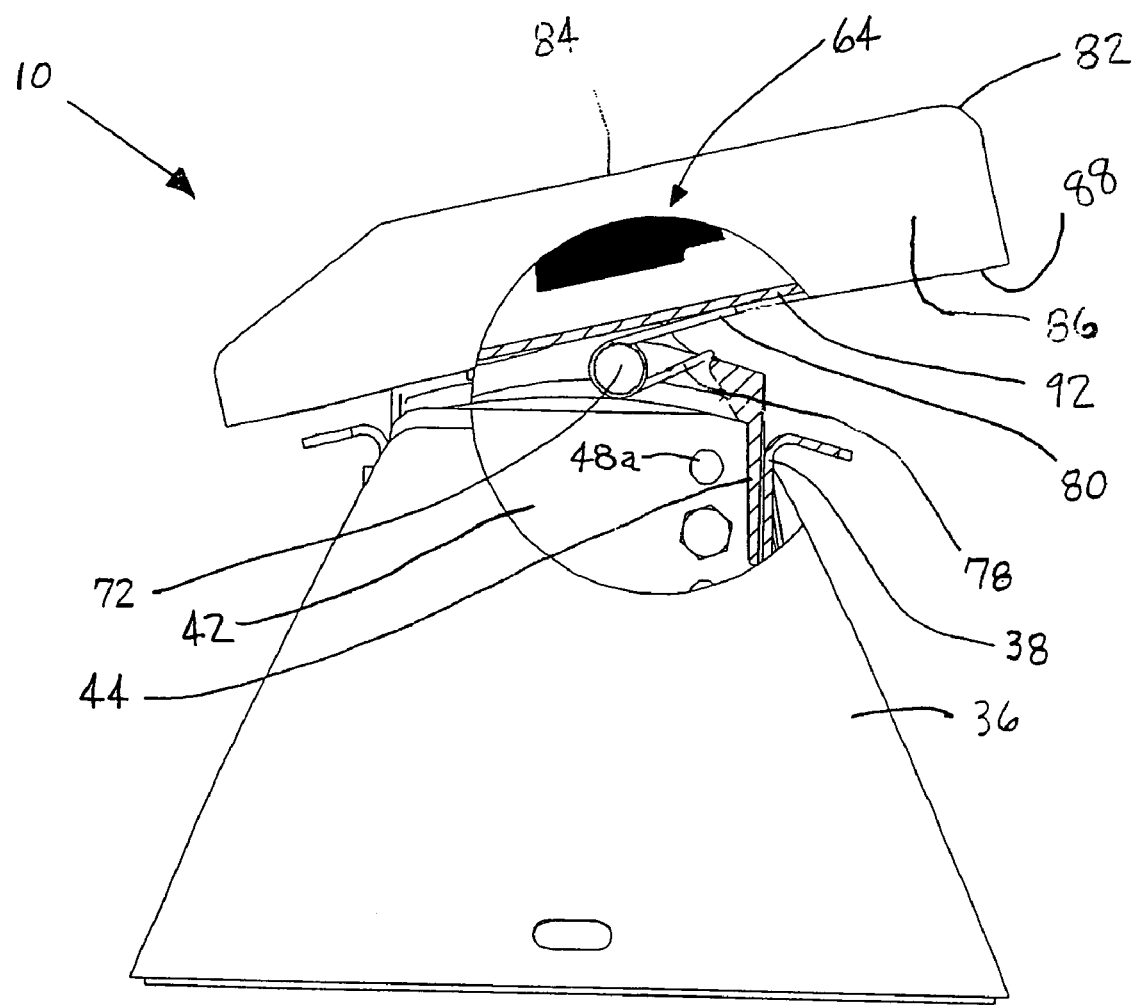
FIG. 4 is a partially cutaway and sectional side elevational view showing how the self-locator urges the head assembly into a raised position.

The operation of the biasing members 12 will now be described in detail and in particular with reference to FIG. 4. The first end 78 of each torsion spring 70 engages the rocker 44 adjacent the post 58. At the same time the second end 80 of each torsion spring 70 engages the bottom face of the mounting platform 92 of the head assembly 16. The torsion springs 70 provide a total biasing moment of between about 35 lb. in. and about 60 lb. in. that functions to position or locate the head assembly 16 and more specifically, the top wall 84 of the skid plate at an included angle with the horizontal of between about 5 and about 15 degrees. In this position, the head assembly 16 and, more particularly, the skid plate 82, throat 90, and jaw assembly 64, are ideally positioned to receive and hold the king pin of a trailer. Further, since the head assembly 16 is self-located in this position, the operator does not need to leave the passenger compartment of the vehicle to properly position the head assembly 16 for trailer connection.

Still further, when the fifth wheel hitch assembly 10 of the present invention is not in use towing a trailer, it should be appreciated that the biasing member 12 is still biasing/holding the head assembly 16 in the home position. Thus, the head assembly 16 is steadied against movement that might otherwise be caused by vehicle acceleration, deceleration and cornering forces. Consequently, head assembly rattling and noise are reduced or eliminated.

The foregoing description of the preferred embodiment of the invention has been presented for purposes of illustration and description. It is not intended to be exhaustive or to limit the invention to the precise form disclosed. Obvious modifications or variations are possible in light of the above teachings. For example, while the biasing member 12 is illustrated as being mounted on the rocker 44, it could be mounted on another structure of the base assembly 14 or even on a structure of the head assembly 16 such as the mounting platform 92. Further, while two biasing members 12 are shown in the drawings, it should be appreciated that a single biasing member or more than two biasing members are also contemplated. Further, other types of springs or structures other than springs are contemplated for use as the biasing member 12.

The embodiment was chosen and described to provide the best illustration of the principles of the invention and its practical application to thereby enable one of ordinary skill in the art to utilize the invention in various embodiments and with various modifications as are suited the particular use contemplated. All such modifications and variations are within the scope of the invention as determined by the appended claims when interpreted in accordance with the breadth, to which they are fairly, legally and equitably entitled. The drawings and preferred embodiment do not and are not intended to limit the ordinary meaning of the claims and their fair and broad interpretation in any way.

Having thus described the invention, we claim:

1. A fifth wheel hitch assembly comprising:
   a base assembly;

a head assembly connected to said base assembly about a first generally horizontal axis wherein said head assembly is pivotable about said first horizontal axis in a front and rearward direction between a raised position and a lowered position, wherein said head assembly is at an acute angle relative to a generally horizontal plane passing through said horizontal axis at said raised position and wherein said head assembly is substantially parallel to said horizontal plane at said lowered position, and further wherein said head assembly is pivotable about a second generally horizontal axis generally perpendicular to said first horizontal axis in a side-to-side direction; and at least one torsion spring, carried on one of said base assembly and said head assembly, urging said head assembly toward said raised position, wherein said torsion spring has a first end engaging said base assembly and a second end engaging said head assembly.

2. The fifth wheel hitch assembly of claim 1, wherein said head assembly includes a skid plate and a locking jaw assembly.

3. The fifth wheel hitch assembly of claim 2, wherein said base assembly includes a first leg, a second leg, and a central housing.

4. The fifth wheel hitch assembly of claim 3, wherein said base assembly further includes a rocker pivotally connected to said central housing.

5. The fifth wheel hitch assembly of claim 4, wherein said central housing includes a first end wall, a second end wall, a first sidewall and a second sidewall.

6. The fifth wheel hitch assembly of claim 5, wherein a pivot pin pivotally connects said rocker to said first and second end walls so as to allow said rocker to pivot freely from side-to-side.

7. The fifth wheel hitch assembly of claim 1, wherein said torsion spring provides a biasing moment of between about 35 lb. in. and about 60 lb. in.

8. The fifth wheel hitch assembly of claim 4, wherein said torsion spring is mounted to said rocker.

9. The fifth wheel hitch assembly of claim 4, wherein said torsion spring is mounted to said head assembly.

10. A fifth wheel hitch assembly comprising:
a base assembly including a central housing and a rocker, said rocker pivotally connected to said central housing;

a head assembly pivotally connected to said base assembly about a generally horizontal axis, said head assembly pivotable between a raised position at an included angle relative to a horizontal plane passing through said horizontal axis of between about 5 and 15 degrees and a lowered position; and at least one torsion spring having an end engaging said head assembly and an opposing end engaging said base assembly wherein said torsion spring is aligned with said horizontal axis and further wherein said torsion spring urges said head assembly into said raised position.

11. The fifth wheel hitch assembly of claim 10 wherein said rocker permits pivotal movement of said head assembly to said raised position.

12. The fifth wheel hitch assembly of claim 11 wherein said base assembly includes at least two trunnions.

13. The fifth wheel hitch assembly of claim 12 wherein at least one trunnion is offset from a center axis of said base assembly.

14. The fifth wheel hitch assembly of claim 10 wherein said head assembly includes a skid plate.

15. A fifth wheel hitch assembly comprising:
a base;
a rocker coupled to said base, wherein said rocker is pivotable in a side-to-side direction about a first generally horizontal axis;
a head assembly coupled to said rocker, wherein said head assembly is pivotable in a front and rearward direction about a second generally horizontal axis; and
a torsion spring urging said head assembly to pivot in a first direction about said second horizontal axis.

16. The fifth wheel hitch assembly of claim 15, wherein said head assembly is pivotable about said second horizontal axis between a raised position and a lowered position.

17. The fifth wheel hitch assembly of claim 16, wherein said first direction is towards said raised position.

18. The fifth wheel hitch assembly of claim 15, wherein said base further includes a central housing, and said rocker is connected to said central housing.

* * * * *